H. B. FOLEY.
SUPPLEMENTAL WHEEL RIM.
APPLICATION FILED DEC. 15, 1917.
1,278,624.
Patented Sept. 10, 1918.
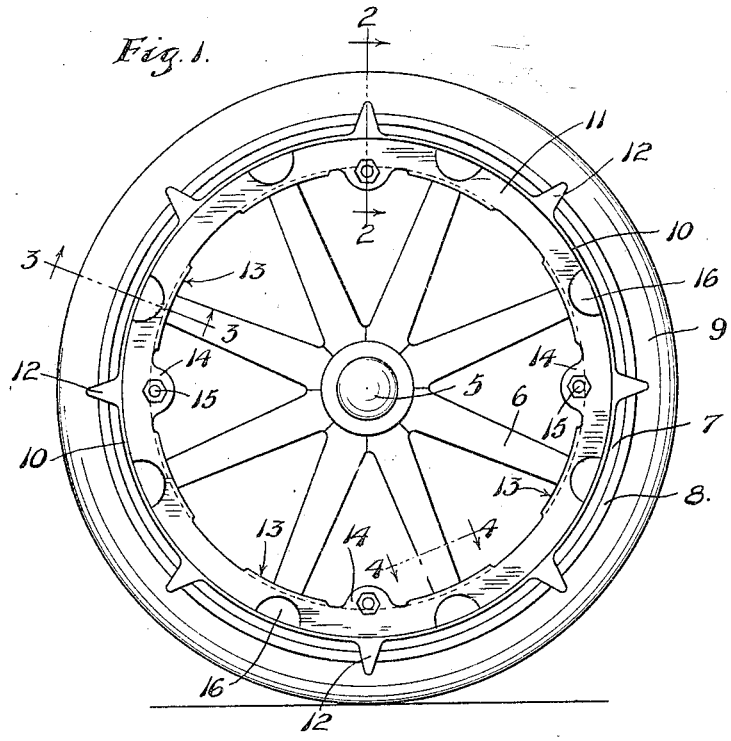
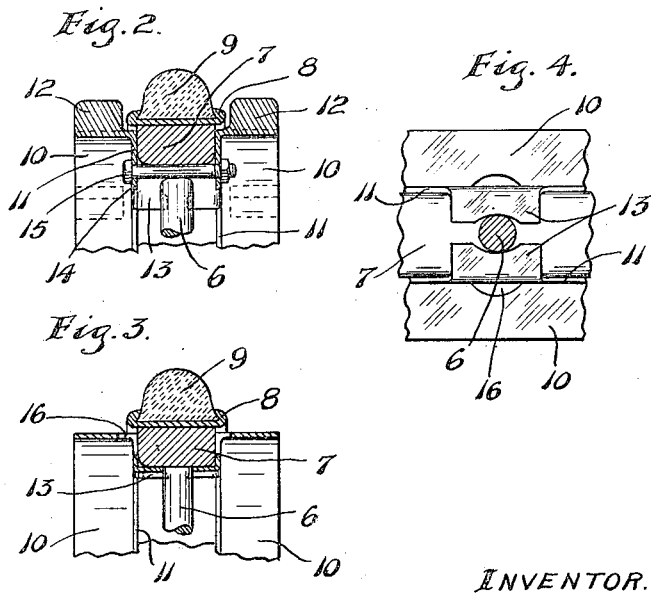
WITNESSES.
H. L. Opsahl.
E. E. Wells
INVENTOR.
H. B. FOLEY.
BY HIS ATTORNEYS.
Williamson Merchant

UNITED STATES PATENT OFFICE.

HUGH B. FOLEY, OF MINNEAPOLIS, MINNESOTA.

SUPPLEMENTAL WHEEL-RIM.

1,278,624.　　　　Specification of Letters Patent.　　Patented Sept. 10, 1918.

Application filed December 15, 1917.　Serial No. 207,227.

*To all whom it may concern:*

Be it known that I, HUGH B. FOLEY, a citizen of the United States, residing at Minneapolis, in the county of Hennepin and State of Minnesota, have invented certain new and useful Improvements in Supplemental Wheel-Rims; and I do hereby declare the following to be a full, clear, and exact description of the invention, such as will enable others skilled in the art to which it appertains to make and use the same.

My invention has for its object to provide a supplemental wheel rim which is capable of being quickly and easily applied to and removed from the wheels of motor propelled vehicles and which in its application does not require defacing of the wheel to which it is applied.

The improved supplemental rim is for the purpose of giving increased traction and is of such a nature that when applied and the vehicle is running on a hard roadbed, the supplemental rim is held out of action so that the lugs or projections thereof will not engage the road and the roadbed will not be damaged thereby. When a wheel having the supplemental rim attached runs into soft ground and sinks slightly, the supplemental rim will be brought into action and will then give not only increased traction, but increased load-bearing or supporting capacity.

The supplemental rims may be applied to both inner and outer sides of the wheels or to one side only. In automobile service supplemental rims will usually be applied only to the outer sides of the wheels, but for heavy motor propelled vehicles or for wheels that are intended to be used at times for tractor purposes, and the like, the supplemental rims will be applied to both the inner and outer sides of the traction wheels.

In the accompanying drawings which illustrate the invention, like characters indicate like parts throughout the several views.

Referring to the drawings:

Figure 1 is a side elevation showing a motor vehicle wheel equipped with my improved supplemental rims;

Fig. 2 is a fragmentary section on the line 2—2 of Fig. 1;

Fig. 3 is a fragmentary section on the line 3—3 of Fig. 1; and

Fig. 4 is a section on the line 4—4 of Fig. 1.

Of the parts of the standard wheel, the numeral 5 indicates the hub, 6 the spokes, 7 the felly, 8 the metal rim, and 9 the solid rubber tire. It will, of course, be understood that the wheel might be of the type provided with a pneumatic tire so far as the present invention is concerned.

In the drawings the supplemental rims are shown as applied both to the inner and outer sides of the wheel. Each supplemental rim comprises a cylindrical portion or rim proper 10, an annular clamping flange 11, and radially projecting traction lugs 12 which parts are preferably formed integral, although they might be separately formed and otherwise rigidly connected.

The cylindrical body portions 10 of the supplemental rims preferably do not engage with the projecting edges of the metal rim 8, but a portion close thereto so that the lugs 12 project radially outward of the said rim 8, but do not project as far outward as the tread portion of the tire 9. The annular clamping flanges 11 are adapted to bear against the sides of the felly 7 and they are provided with inturned anchoring lugs 13 and bolt lugs 14 which latter project radially inward and are perforated to receive nut-equipped clamping bolts 15 that are passed therethrough.

The clamping bolts 15 when thus inserted through the transversely alined lugs 14 of the two supplemental rims closely engage with the inner surface of the felly 7 so that they in themselves hold the supplemental rims centered in respect to the wheel and take the main shear produced by the weight of the load on the supplemental rims. However, the shear on the bolts 15 is reduced to a very considerable extent, first, by the friction produced between the rims and felly when the nuts of the bolts are tightened and, second, by the engagement of the anchoring lugs 13 with the inner surface of the felly.

In fact, the lugs 13 would, in themselves, take the shear and hold the supplemental rim centered in respect to the wheel, even if the bolts 15 were not in direct contact with the felly. However, the described arrangement is preferred.

By referring to Fig. 4, it will be noted that the anchoring lugs 13 are notched so that they embrace the spokes and thus positively prevent circumferential creeping of the supplemental rims on the wheel.

The clamping flanges 11 of the supplemental rims, at suitable points, are provided with openings 16 that are positioned to aline with the nuts of demountable rims when demountable rims are employed. These openings or clamping passages 16 permit access to the nuts of the demountable rims, while the supplemental rims are in position.

It will thus be seen that these supplemental rims may be applied to a vehicle wheel without cutting, boring, or otherwise defacing or reconstructing the wheel in any way. Also, as is evident, the rims may be quickly applied and quickly removed.

When a supplemental rim is to be applied to one side only, for example, to the outer side of the wheel, there should be provided for engagement with the inner face of the felly to serve as an anchor for the bolts, an annular clamping flange such as one of the flanges 11 with a cylindrical portion 10 and lugs 12 left off.

The supplemental rims illustrated are of a type which could be best produced by casting but the construction is such that it is capable of being readily stamped or pressed from sheet metal.

What I claim is:

1. The combination with a vehicle wheel, of annular clamping flanges engageable with the inner and outer faces of the wheel felly, at least one of said clamping flanges having an outstanding cylindrical portion affording a supplemental rim, and nut-equipped bolts passed through said clamping flanges and engaging the inner surface only of the wheel felly, said rim equipped clamping flange having laterally projecting lugs that also engage the inner surface of the felly.

2. The combination with a vehicle wheel, of annular clamping flanges engageable with the inner and outer faces of the wheel felly, at least one of said clamping flanges having an outstanding cylindrical portion affording a supplemental rim, and nut-equipped bolts passed through said clamping flanges and engaging the inner surface only of the wheel felly, said rim equipped clamping flange having laterally projecting lugs that also engage the inner surface of the felly, and the said cylindrical rim forming portion having radially projecting traction lugs that terminate radially inward of the outermost portion of the wheel tire.

3. The combination with a vehicle wheel, of annular clamping flanges engageable with the inner and outer faces of the wheel felly, at least one of said clamping flanges having an outstanding cylindrical portion affording a supplemental rim, and nut-equipped bolts passed through said clamping flanges and engaging the inner surface only of the wheel felly, both of said clamping flanges having laterally projecting lugs that engage the inner surface of the wheel felly and are notched to embrace the spokes of the wheel.

4. The combination with a tire-equipped wheel, of annular clamping flanges engaging the inner and outer surface of the wheel felly and provided with outstanding cylindrical portions equipped with radially projecting lugs and affording supplemental rims, and nut-equipped bolts passed through said annular clamping flanges and directly engaging the inner surface only of the wheel felly, said annular clamping flanges having laterally projecting lugs that also engage the inner surface of the wheel felly and are notched to embrace the spokes of the wheel.

5. The combination with a vehicle wheel, of annular clamping flanges engaging with the inner and outer faces of the wheel felly, at least one of said clamping flanges having an outstanding cylindrical portion affording the supplemental rims and further having laterally projecting lugs that are engaged with the inner surface of the wheel felly, and means for clamping said supplemental rims to said wheel.

In testimony whereof I affix my signature in presence of two witnesses.

HUGH B. FOLEY.

Witnesses:
B. G. BAUMANN,
HARRY D. KILGORE.